July 7, 1925.
R. TRULLINGER
1,545,371
METHOD AND APPARATUS FOR SMOKING MEAT
Filed Feb. 27, 1922    2 Sheets-Sheet 1
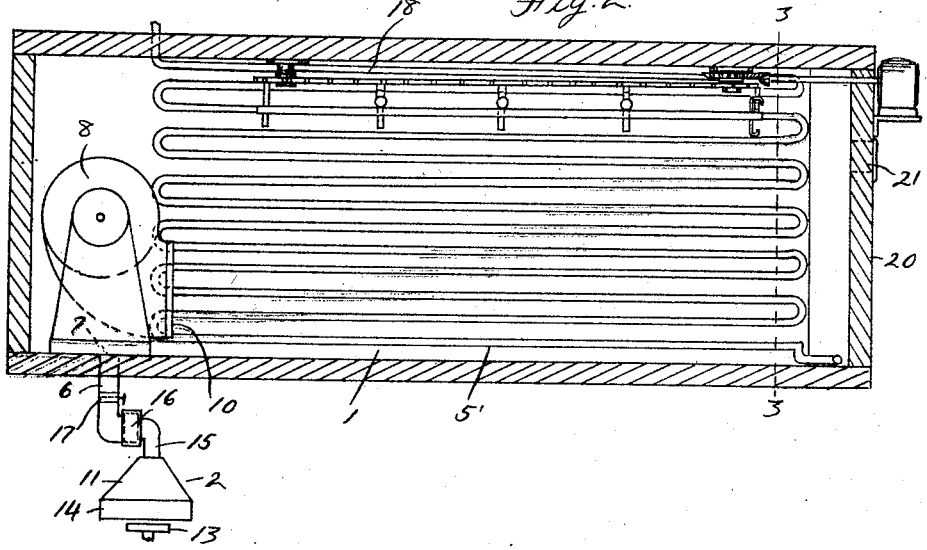
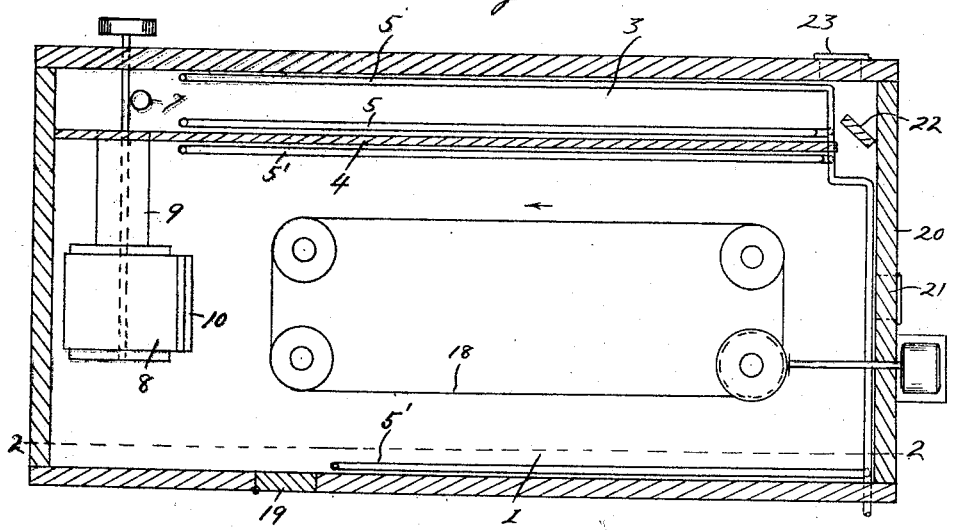
Inventor
Ross Trullinger

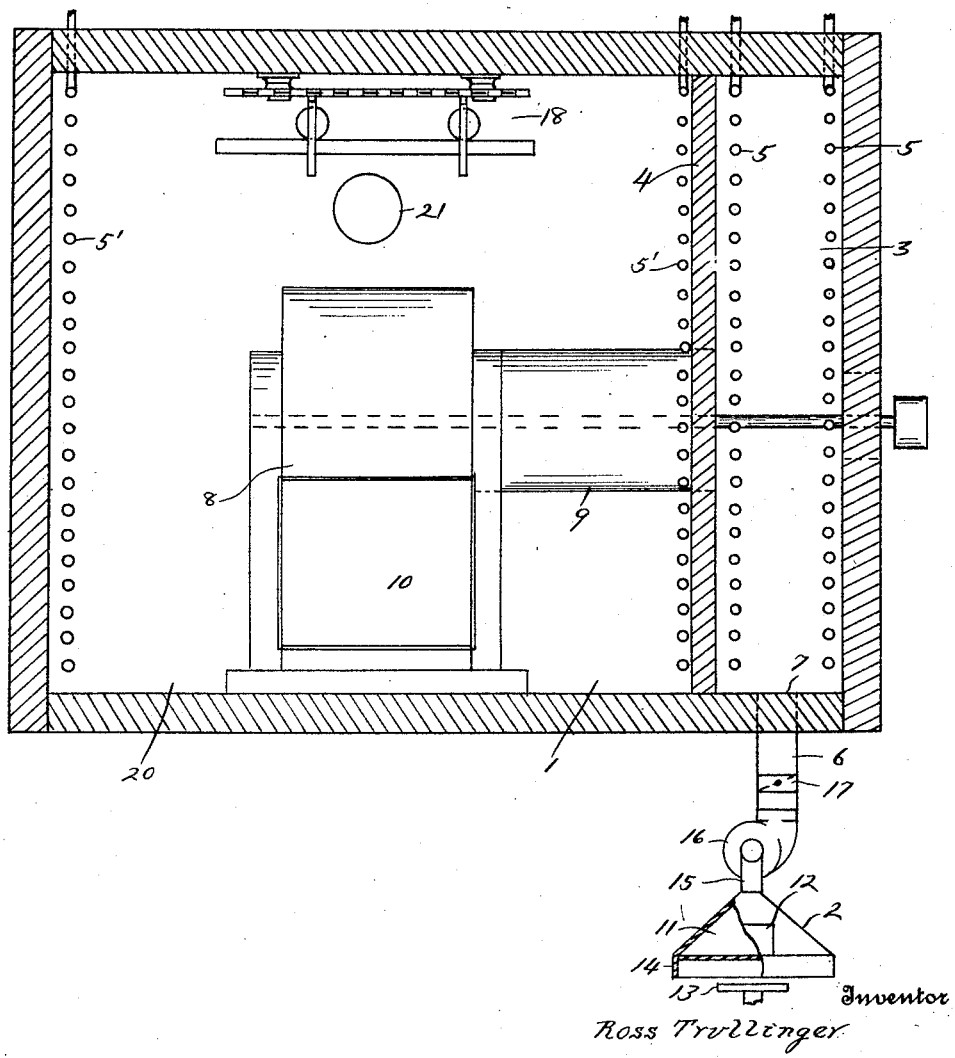

Patented July 7, 1925.

1,545,371

UNITED STATES PATENT OFFICE.

ROSS TRULLINGER, OF DETROIT, MICHIGAN, ASSIGNOR TO ALLIED PACKERS INCORPORATED, OF DETROIT, MICHIGAN, A CORPORATION OF MICHIGAN.

METHOD AND APPARATUS FOR SMOKING MEAT.

Application filed February 27, 1922. Serial No. 539,565.

*To all whom it may concern:*

Be it known that I, Ross TRULLINGER, a citizen of the United States of America, residing at Detroit, in the county of Wayne and State of Michigan, have invented certain new and useful Improvements in Methods and Apparatus for Smoking Meat, of which the following is a specification, reference being had therein to the accompanying drawings.

The invention relates to meat smoking houses and refers particularly to the method of smoking meat and the apparatus for carrying out this method. The invention has for some of its objects the provision of an apparatus occupying much less space for the same output than the apparatuses heretofore used; to reduce the time required to smoke the meat by my method as compared to the time required by the methods heretofore used; to control the amount of shrinkage taking place in the meat by controlling the humidity of the air mixing with the smoke and also drafts; to subject the meat to smoke free of soot whereby the necessity of covering the meat with bags or the like is avoided; and to convey the meat to different parts of the smoke chamber so that the meat will be uniformly smoked.

With these as well as other objects in view, the invention resides in the novel features as more fully hereinafter set forth.

In the drawings:

Figure 1 is a horizontal section near the top through an apparatus embodying my invention;

Figure 2 is a cross section on the line 2—2 of Figure 1;

Figure 3 is a cross section on the line 3—3 of Figure 2.

1 is the smoke chamber of the apparatus adapted to contain the meat, and 2 is the smoke generating device which communicates with the chamber 1. Extending longitudinally of the chamber 1 is the return duct 3 separated from the chamber by a partition 4 and communicating therewith at its opposite ends. This return duct has the series of steam pipes 5 therein for heating the air or mixture of smoke and air to approximately 200° F. and the smoke chamber also has the series of steam pipes 5' to assist in maintaining this temperature. The smoke generating device 2 has the outlet pipe 6 which opens into the return duct 3 at 7 near one end of this duct. For securing a forced circulation of the mixture of smoke and air through the smoke chamber and return duct, there is the fan 8 located substantially centrally at one end of the smoke chamber 1 and having the inlet pipe 9 in communication with the duct adjacent to the smoke entrance 7, this fan having its outlet 10 arranged to direct the mixture longitudinally centrally of the chamber.

The smoke generating apparatus comprises the chamber 11 having an opening for the insertion of the smoke forming material, such as sawdust, which opening is normally closed by the slide 12 and also comprises the burner 13 located below the chamber. The chamber preferably has the depending peripheral flange 14 for retaining the heat generated by the burner. 15 is a pipe leading from the top of the chamber 11 to the fan 16 which draws the smoke from the chamber 11 and forces the same through the outlet pipe 6 and into the return duct 3. The fan is preferably driven by a variable speed motor and there is also a suitable valve 17 in the outlet pipe 6 which can be adjusted to regulate the passage of the smoke into the return duct. With this arrangement of smoke generating apparatus, the smoke forming material is not exposed to the flame and consequently does not burn, but the temperature to which this material is subjected is sufficient to break the same down to form smoke. Owing to the fact that the smoke forming material does not burn, the smoke is free of soot and as a consequence, it may come into direct contact with the meat without liability of deposit of soot thereon. Therefore, the necessity of bags or the like for covering the meat is avoided.

To uniformly smoke the meat, it is carried upon the endless conveyor 18 within the chamber 1 and located near its top, this conveyor being continuously driven by suitable means such as a variable speed electric motor, the arrangement being such that each piece of meat is carried through the same cycle as the other pieces so that any variations in temperature or density of the mixture of smoke and air in different parts of the smoke chamber will not affect one piece differently from the others. Furthermore, with this conveyor, the work of loading the chamber with the fresh meat and unloading the chamber after the meat has been smoked is greatly facilitated, there being an air tight door 19 in the side of the chamber 1 opposite to the partition 4 and opposite one end of the conveyor.

In order to increase the speed of smoking the meat, the mixture of smoke and air, after it has become humid owing to the taking up of moisture in the meat, is displaced by a dry mixture. In detail, the chamber 1 has in its end wall 20 toward which the mixture of smoke and air are directed, the normally closed opening 21 which can be opened to permit of the discharge of the humid mixture of smoke and air. When this opening 21 is open, the door 22 controlling the opening into the chamber 1 at the inlet end of the return duct 3 is closed and the normally closed openings 23 to the outside air at the inlet end of the return duct 3 is opened so that fresh air is drawn through the return duct past the steam pipes and heated to approximately 200° F. when it is mixed with the smoke entering through the smoke entrance 7 and passed into the smoke chamber, this new mixture displacing the humid mixture and thereby lowering the humidity of the mixture passing through the smoke chamber. After the old mixture has been displaced from the chamber, the openings 21 and 23 are again closed and the door 22 opened when the circulation of the smoke and air again takes place through the smoke chamber 1 and return duct 3, new smoke being continuously forced into the mixture by means of the fan 16 in the outlet end of the smoke generating device.

From the above description, it will be readily seen that I have provided a relatively compact apparatus for smoking meat, and furthermore that with my method, the same quantity of meat can be smoked in a decidedly less time than is possible with the methods heretofore used. Also, by reason of the fact that the air when it first enters the apparatus from outside and also the mixture of smoke and air, is heated to a relatively high temperature and its humidity as well as circulation are controlled, the amount of shrinkage of the meat can be controlled within closer limits than is possible with the old method in which the humidity of the air and its draft were not controlled, but were dependent upon atmospheric conditions. Furthermore, the meat being subjected to smoke free of soot, the necessity of covering the meat with bags or the like is avoided; and the meat being continuously conveyed within the smoke chamber, it is uniformly smoked.

What I claim as my invention is:

1. In an apparatus for smoking meat, the combination with a chamber for the meat, of a fan at one end of the chamber for circulating smoke therein, a duct connected to the other end of the chamber and communicating with said fan, means for generating smoke, means for discharging the smoke generated into said duct, means for admitting air from the atmosphere to said duct, means for closing the connection between the chamber and duct while air is being admitted to the duct, and means for permitting the humid mixture of smoke and air in the chamber to escape while the connection aforesaid is closed.

2. In an apparatus for smoking meat, the combination with a chamber for the meat, of a fan at one end of the chamber for circulating smoke therein, a duct connected to the other end of the chamber and communicating with the fan, means for generating smoke, means for conveying the smoke generated into said duct, said duct having a port for admitting air from the atmosphere, a closure for said port, a member for closing the connection between the chamber and duct while air is being admitted to the duct, and a member for permitting the humid mixture of smoke and air in the chamber to escape while the connection aforesaid is closed.

3. In an apparatus for smoking meat, the combination with a housing of a partition dividing the housing into a chamber for receiving the meat and a duct in communication with one end of the chamber, means for generating smoke, means for discharging the generated smoke into said duct, means for conveying the smoke from the duct to the chamber, and means for drawing the smoke through the last-mentioned means from the duct and circulating the smoke in the chamber.

4. In an apparatus for smoking meat, the combination with a chamber containing the meat, a duct in communication with one end of said chamber, means for generating smoke, means for discharging the smoke generated into said duct, and means at the other end of said chamber in communication with said duct for drawing the smoke from said duct and affecting a circulation of the same through the chamber.

5. In an apparatus for smoking meat, the combination with a chamber for the meat, and means for generating smoke, of a duct communicating with one end of said chamber, means for discharging the smoke generated into said duct, and means in communication with the duct adjacent to the point of discharge for drawing the smoke discharged from said duct and affecting a circulation thereof through said chamber.

In testimony whereof I affix my signature.

ROSS TRULLINGER.